US012693370B2

(12) United States Patent
    Koga et al.

(10) Patent No.: US 12,693,370 B2
(45) Date of Patent: Jul. 28, 2026

(54) POSITION ESTIMATION SYSTEM INCLUDING INFRARED SENSOR ARRAY AND ESTIMATOR FOR MONITORING PIXEL TEMPERATURE CHANGE, AND METHOD FOR THE SAME

(71) Applicant: Panasonic Intellectual Property Management Co., Ltd., Osaka (JP)

(72) Inventors: Tatsuo Koga, Osaka (JP); Kazuto Ura, Osaka (JP); Jin Yoshizawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 282 days.

(21) Appl. No.: 18/293,178

(22) PCT Filed: Jul. 21, 2022

(86) PCT No.: PCT/JP2022/028348
    § 371 (c)(1),
    (2) Date: Jan. 29, 2024

(87) PCT Pub. No.: WO2023/032507
    PCT Pub. Date: Mar. 9, 2023

(65) Prior Publication Data
    US 2024/0377498 A1    Nov. 14, 2024

(30) Foreign Application Priority Data
    Aug. 31, 2021    (JP) ................................. 2021-140723

(51) Int. Cl.
    *G01S 5/02*        (2010.01)
    *G06T 7/70*        (2017.01)
(52) U.S. Cl.
    CPC .............. *G01S 5/0264* (2020.05); *G06T 7/70* (2017.01); *G06T 2207/30196* (2013.01)

(58) Field of Classification Search
    CPC .............................. G01S 5/0264; G06T 7/70; G06T 2207/30196
    (Continued)

(56) References Cited

U.S. PATENT DOCUMENTS

2008/0106468 A1* 5/2008 Litva ...................... G01V 15/00
                                                        342/451
2015/0094952 A1* 4/2015 Moeglein ................ G01S 19/14
                                                        701/532

(Continued)

FOREIGN PATENT DOCUMENTS

EP          2060857 A1    5/2009
JP       2014-048416 A    3/2014
(Continued)

OTHER PUBLICATIONS

Extended European Search report for corresponding European Application No. 22864095.9, issued Dec. 3, 2024.
(Continued)

*Primary Examiner* — Brady W Frazier
(74) *Attorney, Agent, or Firm* — Renner, Otto, Boisselle & Sklar, LLP

(57)            ABSTRACT

A position estimation system includes: an obtainer that obtains image information of an image showing an indoor space in which a target object is located; an estimator that estimates coordinates of the target object in the indoor space, based on the image information obtained; a position information obtainer that obtains target position information that is position information of the target object from a positioning system; and a controller that stores identification information of the target object in association with the coordinates estimated, the identification information being included in the target position information obtained.

10 Claims, 9 Drawing Sheets

|  | Identification information | Position (coordinates) |
|---|---|---|
| Position information of person A | a000001 | (x1, y1) |
| Position information of person B | b000001 | (x2, y2) |
| Position information of chair C | c000001 | (x3, y3) |

(58) Field of Classification Search
USPC ........................................................ 342/451
See application file for complete search history.

(56)                    References Cited

U.S. PATENT DOCUMENTS

| 2016/0066157 | A1* | 3/2016 | Noorshams ............. | H04W 4/80 |
| | | | | 455/457 |
| 2016/0170004 | A1* | 6/2016 | Kim ...................... | G01S 5/0242 |
| | | | | 342/451 |
| 2019/0162815 | A1 | 5/2019 | Taniguchi | |
| 2020/0082545 | A1* | 3/2020 | Wylie ..................... | G01S 19/51 |
| 2021/0247192 | A1 | 8/2021 | Matsumoto | |

FOREIGN PATENT DOCUMENTS

| JP | 2018-204922 A | 12/2018 |
| JP | 2020-020645 A | 2/2020 |
| JP | 2020-112441 A | 7/2020 |
| JP | 2021-169963 A | 10/2021 |
| SG | 10201804861 T | 1/2019 |
| WO | 2008/029679 A1 | 3/2008 |

OTHER PUBLICATIONS

International Search Report for corresponding Application No. PCT/JP2022/028348, mailed Aug. 30, 2022.
Written Opinion for corresponding Application No. PCT/JP2022/028348, mailed Aug. 30, 2022.
Japanese Office Action corresponding to Japanese Patent Application No. 2023-545150 dated Aug. 20, 2024.

* cited by examiner

|  | Identification information | Position (coordinates) |
|---|---|---|
| Position information of person A | a000001 | (x1, y1) |
| Position information of person B | b000001 | (x2, y2) |
| Position information of chair C | c000001 | (x3, y3) |

FIG. 7

| | | | | | | | |
|---|---|---|---|---|---|---|---|
| 27.25 | 27.50 | 26.75 | 27.00 | 27.50 | 27.25 | 27.00 | 26.75 |
| 27.25 | 27.50 | 27.25 | 28.00 | 27.75 | 28.50 | 25.50 | 26.75 |
| 30.00 | 29.25 | 29.00 | 28.00 | 27.75 | 26.25 | 26.75 | 25.50 |
| 29.50 | 30.00 | 29.50 | 28.75 | 27.50 | 27.25 | 26.50 | 26.75 |
| 30.25 | 30.00 | 30.00 | 29.25 | 28.00 | 26.50 | 26.25 | 26.25 |
| 30.00 | 29.75 | 30.00 | 29.00 | 26.75 | 26.00 | 26.25 | 26.00 |
| 30.25 | 30.25 | 29.50 | 28.25 | 26.50 | 26.00 | 26.75 | 25.50 |
| 29.50 | 29.75 | 28.50 | 26.75 | 26.50 | 26.25 | 26.50 | 26.00 |

POSITION ESTIMATION SYSTEM INCLUDING INFRARED SENSOR ARRAY AND ESTIMATOR FOR MONITORING PIXEL TEMPERATURE CHANGE, AND METHOD FOR THE SAME

TECHNICAL FIELD

The present invention relates to a position estimation system and a position estimation method.

BACKGROUND ART

There is known a technology for estimating the position of an object. Patent Literature (PTL) 1 discloses a technology for detecting the position of a video projection device from the MAC addresses of a plurality of access points and the radio field strength.

CITATION LIST

Patent Literature

[PTL 1] Japanese Unexamined Patent Application Publication No. 2014-048416

SUMMARY OF INVENTION

Technical Problem

The present invention provides a position estimation system and a position estimation method that are capable of estimating with high accuracy what object is located in which position in a predetermined space.

Solution to Problem

The position estimation system according to an aspect of the present invention includes: an obtainer that obtains information which is one of image information of an image showing a space in which a target object is located or temperature distribution information of the space; an estimator that estimates coordinates of the target object in the space, based on the information obtained; a position information obtainer that obtains target position information that is position information of the target object from a positioning system that measures a position of an object located in the space based on a state of communication between a first communication device held by the object and a plurality of second communication devices disposed in the space; and a controller that stores, onto storage, identification information of the target object in association with the coordinates estimated, the identification information being included in the target position information obtained.

The position estimation method according to an aspect of the present invention includes: obtaining information which is one of image information of an image showing a space in which a target object is located or temperature distribution information of the space; estimating coordinates of the target object in the space, based on the information obtained; obtaining target position information that is position information of the target object from a positioning system that measures a position of an object located in the space based on a state of communication between a first communication device held by the object and a plurality of second communication devices disposed in the space; and storing identification information of the target object in association with the coordinates estimated, the identification information being included in the target position information obtained.

The recording medium according to an aspect of the present invention is a non-transitory, computer-readable recording medium having recorded thereon a program for causing a computer to execute the position estimation method.

Advantageous Effects of Invention

The position estimation system and the position estimation method according to the present invention are capable of estimating with high accuracy what object is located in which position in a predetermined space.

BRIEF DESCRIPTION OF DRAWINGS

FIG. 7 is a diagram that schematically shows a thermal image.

DESCRIPTION OF EMBODIMENTS

Figure 1:
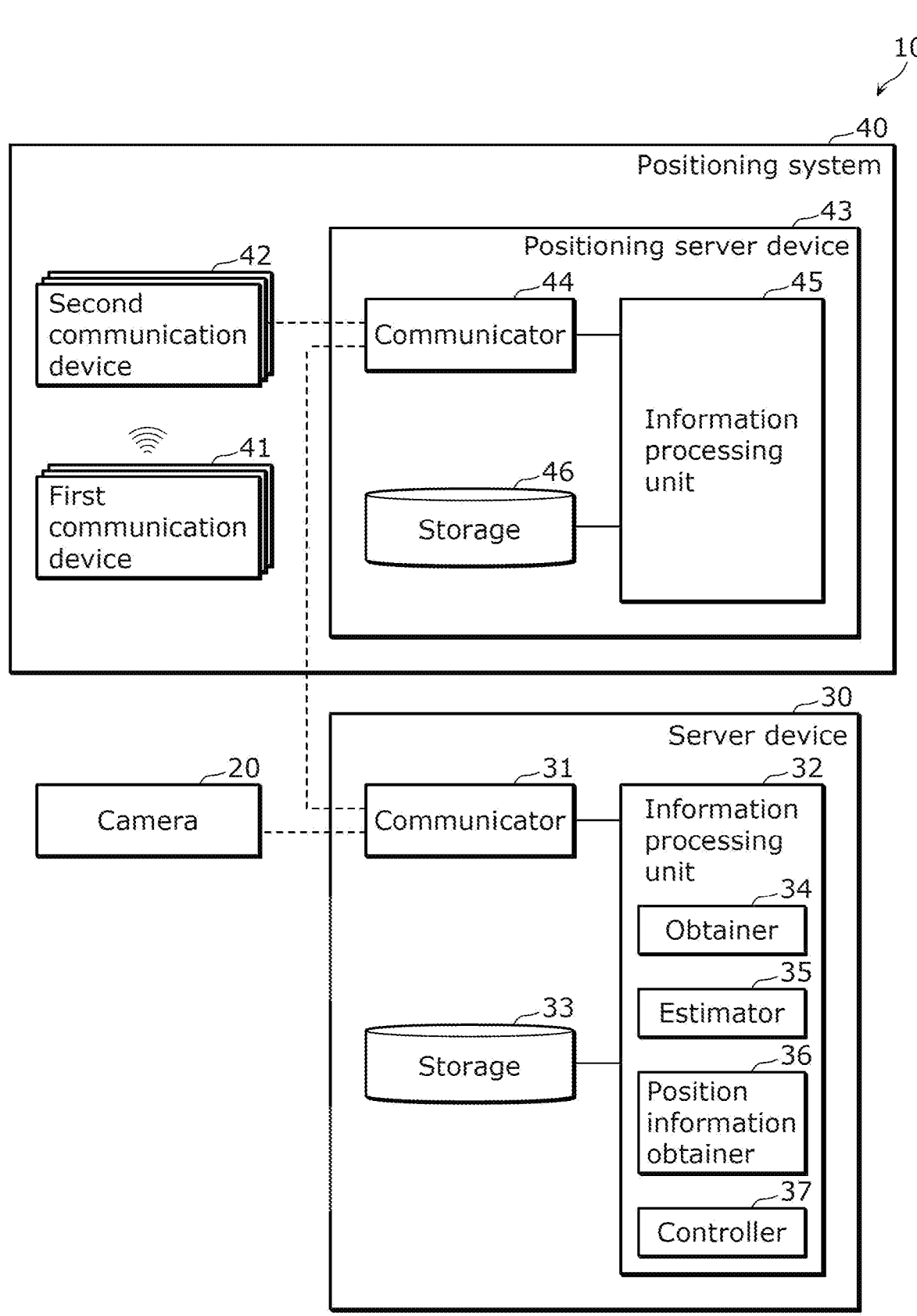
FIG. 1 is a block diagram showing the functional configuration of a position estimation system according to Embodiment 1.

Hereinafter, certain exemplary embodiments are described in greater detail with reference to the accompanying Drawings. Each of the exemplary embodiments described below shows a general or specific example. The numerical values, shapes, materials, elements, the arrangement and connection of the elements, steps, the processing order of the steps, etc. shown in the following exemplary embodiments are mere examples, and therefore do not limit the scope of the present invention. Therefore, among the elements in the following exemplary embodiments, those not recited in any one of the independent claims are described as optional elements.

The drawings are schematic views, and are not always strictly drawn. In the drawings, the same referential numerals are given to substantially the same configurations, and duplication of descriptions of the substantially the same configurations will be omitted or simplified in some cases.

Embodiment 1

[Configuration]

Figure 2:
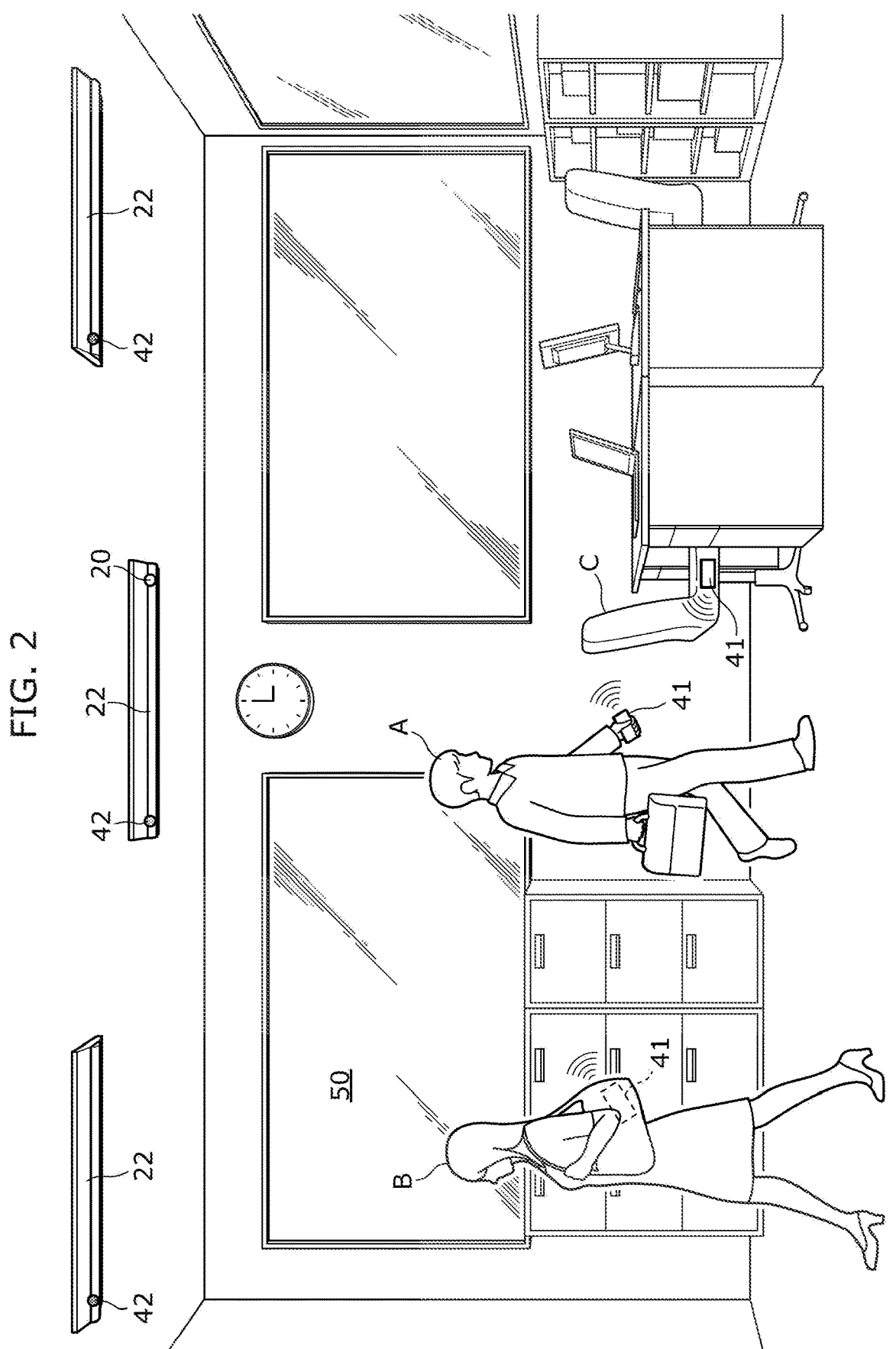
FIG. 2 is a diagram showing an indoor space to which the position estimation system according to Embodiment 1 is applied.

First, the configuration of the position estimation system according to Embodiment 1 is described. FIG. 1 is a block diagram showing the functional configuration of the position estimation system according to Embodiment 1. FIG. 2 is a diagram showing an indoor space to which the position estimation system according to Embodiment 1 is applied.

Position estimation system 10 is a system that obtains image information of an image of indoor space 50 outputted by camera 20, and estimates the coordinates of a target object among objects located in indoor space 50, on the basis of the obtained image information. Indoor space 50 is, for example, an office space, but may also be a space in a commercial facility or an indoor space in other facilities such as a space in a residence. The target object (object) is, for example, a living matter such as person A and person B, but may also be a tangible object such as chair C (object other than person, such as non-living matter).

As shown in FIG. 1 and FIG. 2, position estimation system 10 includes camera 20, server device 30, and positioning system 40. Note that position estimation system 10 may include a plurality of cameras 20.

Camera 20 is disposed, for example, on the ceiling of indoor space 50, and captures an image of indoor space 50 from above. Camera 20 also transmits image information of the captured image to server device 30. The image captured by camera 20 is, for example, a still image. Camera 20 may also capture a moving image. In this case, an image captured by camera 20 is a still image that corresponds, for example, to one frame which constitutes the moving image. Camera 20 is implemented, for example, in the form of an image sensor.

As shown in FIG. 2, camera 20 is detachably connected, for example, to a power supply terminal included in lighting device 22 that is disposed on the ceiling of indoor space 50. Camera 20 operates on electric power supplied from lighting device 22. The power supply terminal is, for example, a universal serial bus (USB) terminal. Camera 20 may be fixed not via lighting device 22 but directly to the ceiling of indoor space 50. Camera 20 may also be fixed to a wall, for example, to capture an image of indoor space 50 from a lateral side.

Server device 30 obtains the image information generated by camera 20, and estimates the coordinates of the target object located in indoor space 50, on the basis of the obtained image information. Server device 30 is an edge computer provided in the facility (building) that includes indoor space 50, but may also be a cloud computer provided outside of such facility. Server device 30 includes communicator 31, information processing unit 32, and storage 33.

Communicator 31 is a communication module (communication circuit) used by server device 30 to communicate with camera 20 and positioning system 40. Communicator 31 receives, for example, the image information from camera 20. Communicator 31 also receives position information of each object located in indoor space 50 from positioning system 40. Communication performed by communicator 31 may either be wireless communication or wired communication. A communications standard used for the communication is not limited to a specific communications standard.

Information processing unit 32 obtains the image information received by communicator 31, and performs information processing for estimating the coordinates of the target object located in indoor space 50, on the basis of the obtained image information. Information processing unit 32 is more specifically implemented in the form of a processor or a microcomputer. Information processing unit 32 includes obtainer 34, estimator 35, position information obtainer 36, and controller 37. The functions of obtainer 34, estimator 35, position information obtainer 36, and controller 37 are realized by means of the processor or the microcomputer that forms information processing unit 32 executing a computer program stored in storage 33. The functions of obtainer 34, estimator 35, position information obtainer 36, and controller 37 are described in more detail later.

Storage 33 is a storage device that stores the image information and the position information received by communicator 31, the computer program executed by information processing unit 32, and so forth. Storage 33 also stores a machine learning model to be described later, registration information that indicates what object is specifically indicated by first identification information to be described later, and so forth. Storage 33 is more specifically implemented, for example, in the form of a semiconductor memory or a hard disk drive (HDD).

Positioning system 40 measures the position of an object located in indoor space 50, on the basis of a state of communication between first communication device 41 held by the object in indoor space 50 and a plurality of second communication devices 42 disposed in indoor space 50. Positioning system 40 includes a plurality of first communication devices 41, a plurality of second communication devices 42, and positioning server device 43. Note that positioning system 40 is simply required to include at least one first communication device 41.

First communication device 41 is a beacon transmitter that transmits a beacon signal. First communication device 41 is, for example, a device specific to beacon transmission, but may also be a mobile information terminal (e.g., smartphone) capable of operating as a beacon transmitter. As shown in FIG. 2, first communication device 41 is held by an object (person or tangible object) located in indoor space 50. A beacon signal includes first identification information of the object that holds first communication device 41. The first identification information can be the identification information of first communication device 41 per se.

Second communication device 42 is a beacon receiver (scanner) that receives a beacon signal transmitted by first communication device 41. Second communication device 42 measures the received signal strength indicator (RSSI) of the received beacon signal, and transmits, to positioning server device 43, signal strength information in which the measured RSSI is associated with the first identification information included in the beacon signal and second identification information of second communion device 42 per se.

As shown in FIG. 2, second communication device 42 is detachably connected, for example, to a power supply terminal included in lighting device 22 that is disposed on the ceiling of indoor space 50. Second communication device 42 operates on electric power supplied from lighting device 22. The power supply terminal is, for example, an USB terminal. Second communication device 42 may be fixed not via lighting device 22 but directly to the ceiling of indoor space 50. Second communication device 42 may also be fixed, for example, to a wall. Note that a plurality of second communication devices 42 are disposed in a two-dimensionally dispersed manner in a top view, as shown in FIG. 2.

Positioning server device 43 obtains, from each of the plurality of second communication devices 42, the signal strength information of the beacon signal transmitted by first communication device 41, and measures the position of the object that holds such first communication device 41, on the basis of the obtained signal strength information. Positioning server device 43 is an edge computer provided in the facility (building) that includes indoor space 50, but may also be a cloud computer provided outside of such facility. Positioning server device 43 includes communicator 44, information processing unit 45, and storage 46.

Communicator 44 is a communication module (communication circuit) used by positioning server device 43 to communicate with the plurality of second communication devices 42 and server device 30. Communicator 44 receives, for example, the signal strength information from each of the plurality of second communication devices 42. Communicator 44 also transmits the position information of each object located in indoor space 50 to server device 30. Communication performed by communicator 44 may either be wireless communication or wired communication. A communications standard used for the communication is not limited to a specific communications standard.

Information processing unit 45 measures the position of the object located in indoor space 50, on the basis of items of signal strength information received by communicator 44, and outputs position information indicating the measured position. Communicator 44 transmits the outputted position information to server device 30.

For example, information processing unit 45 measures the position of person A, on the basis of the first identification information of person A (first identification information included in the beacon signal transmitted by first communication device 41 held by person A), items of signal strength information that include the second identification information of each of second communication devices 42 per se, and layout information indicating the layout (disposition position) of the plurality of second communication devices 42 in indoor space 50. Information processing unit 45 then outputs position information (i.e., position information of person A) in which the measured position is associated with the first identification information of person A. The layout information is more specifically information in which the second identification information of each of second communication devices 42 is associated with the coordinates of the position at which second communication device 42 is disposed (two-dimensional coordinates). Any known algorithm may be used as a method of performing position measurement on the basis of the items of signal strength information and the layout information.

Information processing unit 45 is more specifically implemented in the form of a processor or a microcomputer. The function of information processing unit 45 is realized by means of the processor or the microcomputer that forms information processing unit 45 executing a computer program stored in storage 46.

Storage 46 is a storage device that stores the signal strength information received by communicator 44, the layout information indicating the layout of the plurality of second communication devices 42, the computer program executed by information processing unit 45, and so forth. Storage 46 also stores registration information that indicates what object is specifically indicated by which first identification information. Storage 46 is more specifically implemented, for example, in the form of a semiconductor memory or an HDD.

Example Operation

As described above, positioning system 40 is capable of measuring the position of an object that holds first communication device 41, on the basis of the RSSI, observed at each of the plurality of second communication devices 42, of the beacon signal transmitted by first communication device 41, and the layout information of the plurality of second communication devices 42. More specifically, positioning system 40 is capable of determining what object is located in which position in indoor space 50. However, the accuracy of positions measured by positioning system 40 can be not so high in some cases.

Figures 3, 4:
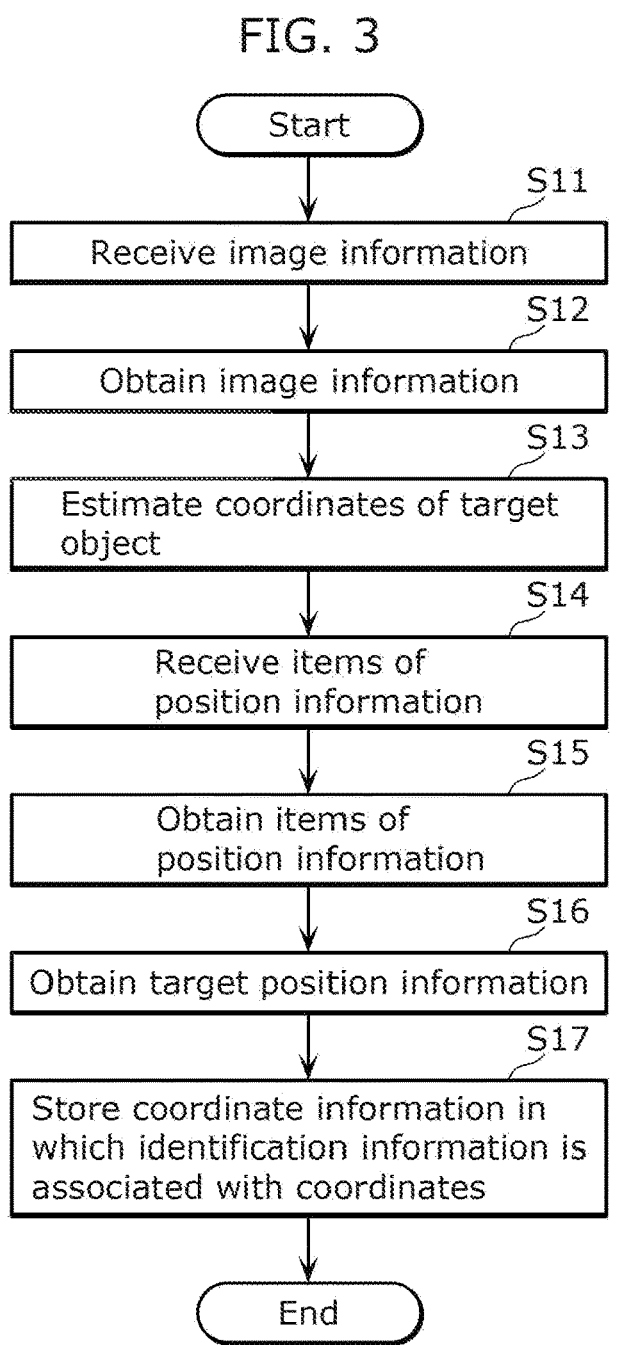
FIG. 3 is a flowchart of an example operation performed by the position estimation system according to Embodiment 1.
FIG. 4 is a diagram that schematically shows items of position information.

In view of this, position estimation system 10 estimates the position of a target object with high accuracy, using image information of an image captured by camera 20, together with the position information of each object provided by positioning system 40. The following describes an example operation performed by such position estimation system 10. FIG. 3 is a flowchart of an example operation performed by position estimation system 10.

Communicator 31 of server device 30 receives image information from camera 20 (S11). Information processing unit 32 stores the received image information onto storage 33. As described above, the image information is, for example, image information of an image in a top view of indoor space 50.

Subsequently, obtainer 34 obtains the image information received by communicator 31 and stored in storage 33 (S12). Estimator 35 estimates the coordinates of the target object in indoor space 50, on the basis of the obtained image information (S13).

Estimator 35 estimates the position of the target object in the image, for example, by performing, on the image information (image), object detection processing that utilizes deep learning (machine learning model), and converts the position of the target object in the image into coordinates in indoor space 50. More specifically, estimator 35 performs object detection processing that is based on a method such as region-convolutional neural network (R-CNN), you only look at once (YOLO), and single shot multibox detector (SSD). These machine learning models for performing the object detection processing are constructed, for example, using, as training data, images obtained by imaging indoor spaces 50 (or another indoor space) from above.

Storage 33 stores table information that shows the correspondence between the position of each pixel in the image and its coordinates in indoor space 50. Using such table information, estimator 35 is capable of converting the position of the target object in the image into the coordinates of the target object in indoor space 50.

When the image is an image in a top view of indoor space 50, the coordinates of the position of the target object estimated by estimator 35 are two-dimensional coordinates in a top view of indoor space 50.

Subsequently, communicator 31 receives, from positioning server device 43, items of position information indicating the positions of objects, each of which is located in indoor space 50 (S14). Information processing unit 32 stores the items of position information received onto storage 33. FIG. 4 is a diagram that schematically shows the items of position information. As shown in FIG. 4, in each of the items of position information, the first identification information of the corresponding object is associated with the position (coordinates) of such object. The position of the object is, for example, two-dimensional coordinates in a top view of indoor space 50.

Subsequently, position information obtainer 36 obtains the items of position information received by communicator 31 and stored in storage 33 (S15). Position information obtainer 36 then obtains (selects) the position information, among the items of position information obtained, that indicates the position of the object which is located closest to the estimated coordinates as target position information (S16).

Subsequently, controller 37 regards the first identification information included in the obtained target position information as the identification information of the target object, and stores such first identification information onto storage 33 as coordinate information in association with the coordinates estimated in step S13 (S17).

When the processes of step S13 through step S17 are performed on all objects located in indoor space 50 as target objects, the coordinate information of each of all such objects is stored onto storage 33. Note that what object is specifically indicated by which first identification information is preliminarily registered in storage 33.

The coordinate information stored in the foregoing manner is provided, for example, by controller 37 to an information terminal (not shown) such as a personal computer and a smartphone, and is visualized by such information terminal. This allows the user viewing the display of the information terminal to easily grasp the position of an object in indoor space 50. When the object is a tangible object, it becomes easier, for example, to grasp the position of the tangible object and perform a maintenance work for the tangible object.

Alternatively, the coordinate information may be provided to a control device (not shown) that controls a device such as an air conditioner. When the target object is a person, for example, the control device is capable of controlling the device, on the basis of the position of the person in indoor space 50.

As described above, position estimation system 10 estimates the coordinates of a target object with high accuracy, on the basis of image information. While it is sometimes difficult to identify a target object on the basis of image information, position estimation system 10 is capable of locating the position of the target object, using the position information obtained from positioning system 40 as the identification information of such target object. This allows position estimation system 10 to estimate with high accuracy what object is located in which position in indoor space 50 and manage what object is located in which position in indoor space 50.

In the foregoing example operation, estimator 35 estimates the coordinates of the target object in indoor space 50 by performing the object detection processing on the image information (image) obtained by obtainer 34. However, estimator 35 may also perform processing of dividing an image into regions. More specifically, estimator 35 may perform segmentation that utilizes deep learning (machine learning model). Estimator 35 is capable of estimating the coordinates of the target object in indoor space 50, on the basis of the position of the region in the image showing such target object. The machine learning model for performing segmentation is constructed, for example, using, as training data, images obtained by imaging indoor spaces 50 (or another indoor space) from above.

Embodiment 2

[Configuration]

Figure 5:
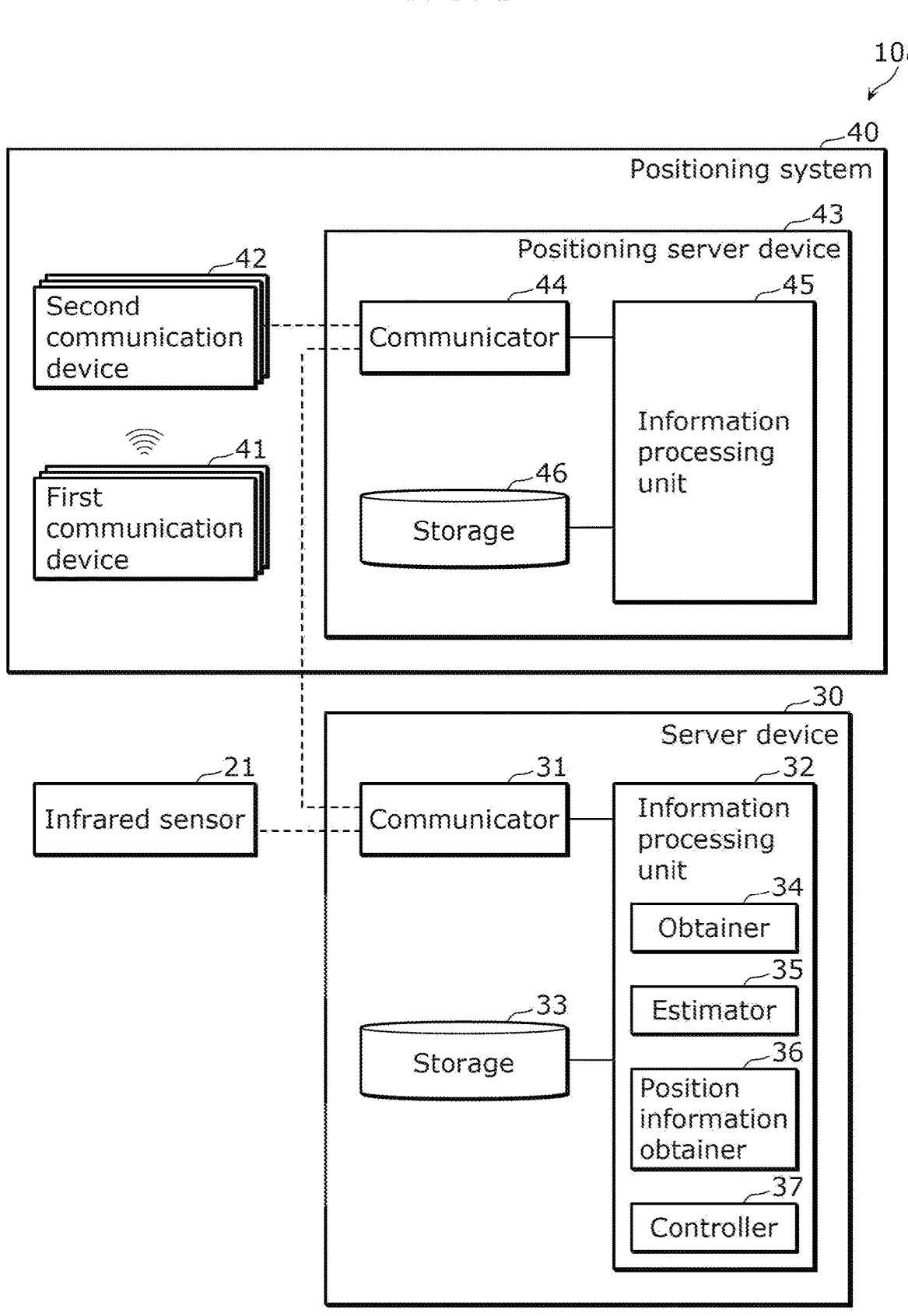
FIG. 5 is a block diagram showing the functional configuration of a position estimation system according to Embodiment 2.

The following describes the configuration of a position estimation system according to Embodiment 2. FIG. 5 is a block diagram showing the functional configuration of the position estimation system according to Embodiment 2.

Figure 6:
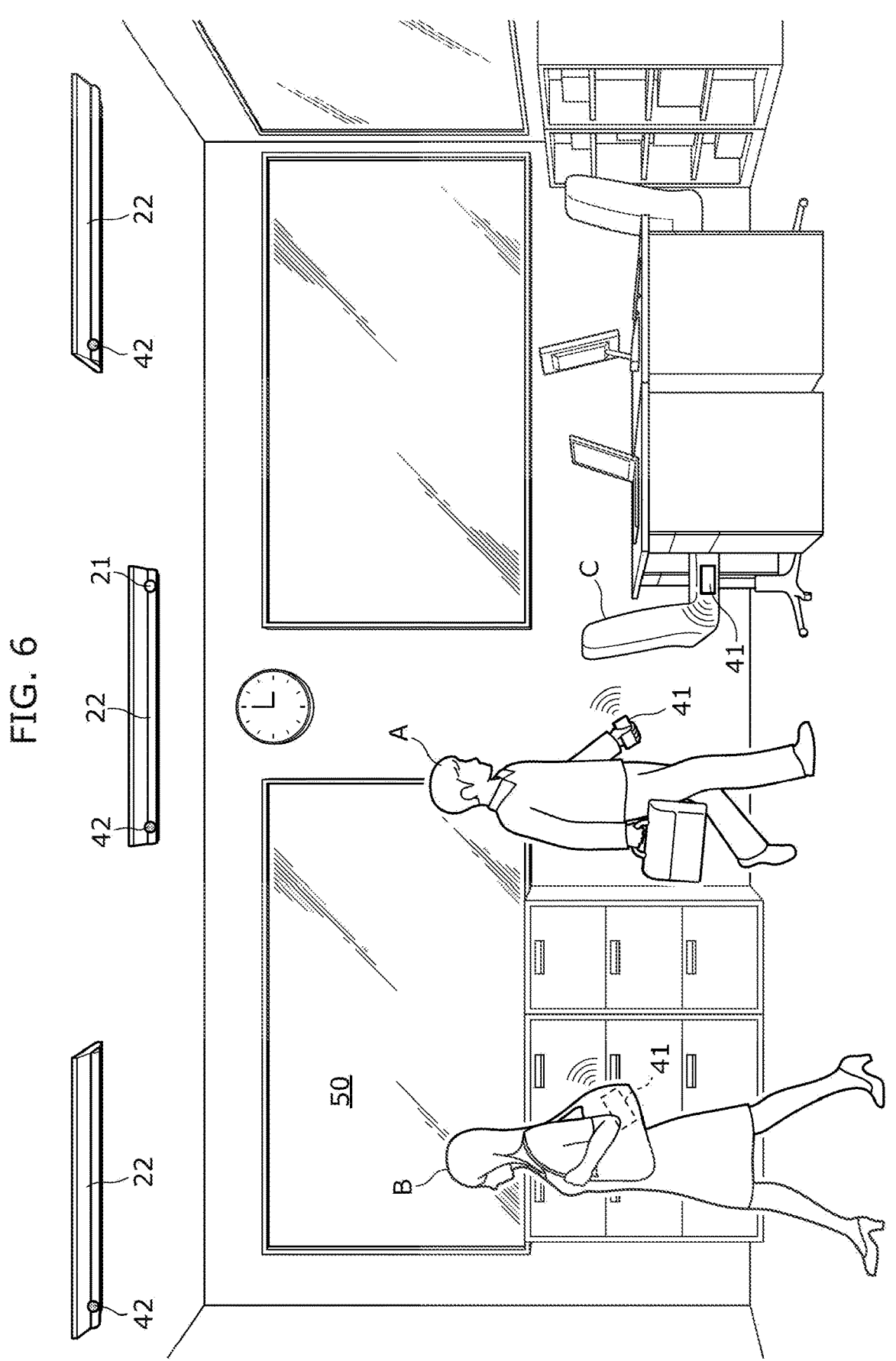
FIG. 6 is a diagram showing an indoor space to which the position estimation system according to Embodiment 2 is applied.

FIG. 6 is a diagram showing indoor space 50 to which the position estimation system according to Embodiment 2 is applied.

Position estimation system 10a is a system that obtains temperature distribution information indicating the temperature distribution of indoor space 50 outputted by infrared sensor 21, and estimates the coordinates of a target object, among the objects located in indoor space 50, on the basis of the obtained temperature distribution information.

As shown in FIG. 5 and FIG. 6, position estimation system 10a includes infrared sensor 21, server device 30, and positioning system 40. Stated differently, position estimation system 10a includes infrared sensor 21 instead of camera 20. Note that position estimation system 10a may include a plurality of infrared sensors 21.

Of the elements included in position estimation system 10a, elements other than infrared sensor 21 are the same as those of Embodiment 1, and will not be described in detail.

Infrared sensor 21 is disposed, for example, on the ceiling of indoor space 50. Infrared sensor 21 generates temperature distribution information (hereinafter also described as "thermal image") that shows the temperature distribution in a top view of indoor space 50, and transmits the generated temperature distribution information to server device 30. Infrared sensor 21 is, for example, an infrared array sensor (thermal image sensor) that includes an array of 8×8 infrared detection elements. Stated differently, a thermal image generated by infrared sensor 21 has 8×8 pixels.

The thermal image shows the temperature distribution in the sensing range of infrared sensor 21 at the resolution of 8×8. FIG. 7 is a diagram that schematically shows the thermal image. Each of the 8×8 small regions in FIG. 7 represents a pixel included in the thermal image. The numeric value in each of the pixels is a pixel value which more specifically indicates a temperature. The temperature here is a surface temperature of indoor space 50. For simplicity of description, a pixel value is described as a temperature value in Embodiment 2 described below.

Note that infrared sensor 21 is not limited to an infrared array sensor, and thus may be, for example, a sensor that scans indoor space 50, using a single infrared detection element. Infrared sensor 21 may also be an infrared image sensor having relatively high resolution.

As shown in FIG. 6, infrared sensor 21 is detachably connected, for example, to a power supply terminal included in lighting device 22 that is disposed on the ceiling of indoor space 50. Infrared sensor 21 operates on electric power supplied from lighting device 22. The power supply terminal is, for example, an USB terminal. Infrared sensor 21 may be fixed not via lighting device 22 but directly to the ceiling of indoor space 50. Infrared sensor 21 may also be fixed, for example, to a wall to generate a thermal image that shows the temperature distribution in a lateral view of indoor space 50.

Example Operation

Figure 8:
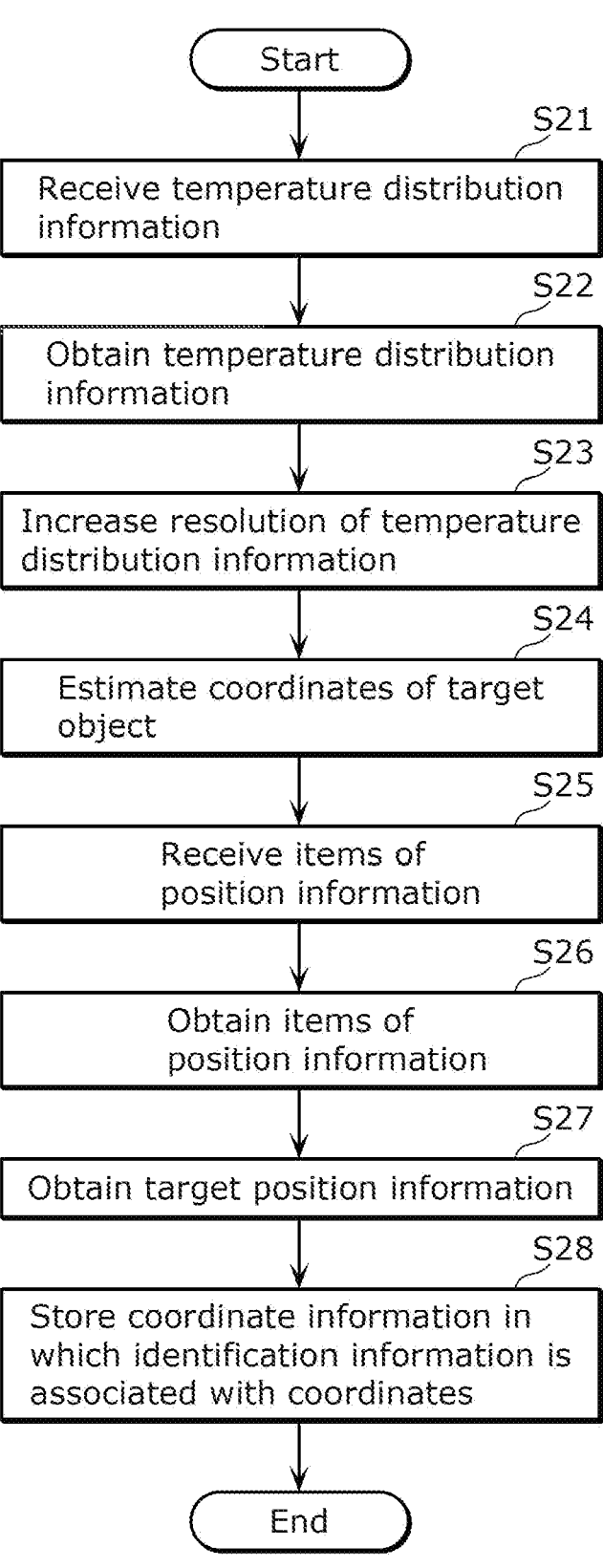
FIG. 8 is a flowchart of an example operation performed by the position estimation system according to Embodiment 2.

Position estimation system 10a estimates the position of a target object with high accuracy, using the temperature distribution information obtained by infrared sensor 21, together with the position information of each object provided by positioning system 40. The target object here is an object whose temperature is different from the surrounding temperatures. The target object is, for example, a person (living matter), but may also be a tangible object (object other than person) whose temperature is different from the surrounding temperatures. The following describes an example operation performed by such position estimation system 10a. FIG. 8 is a flowchart of an example operation performed by position estimation system 10a.

Communicator 31 of server device 30 receives the temperature distribution information from infrared sensor 21 (S21). Information processing unit 32 stores the received temperature distribution information onto storage 33. As described above, the temperature distribution information indicates, for example, the temperature distribution in a top view of indoor space 50.

Subsequently, obtainer 34 obtains the temperature distribution information received by communicator 31 and stored in storage 33 (S22). Estimator 35 applies super-resolution technology to the obtained temperature distribution information to increase the resolution of the temperature distribution information (S23). In the following description of steps S23 and S24, the temperature distribution information is described as "thermal image".

For example, estimator 35 applies generative adversarial network for super-resolution (SRGAN) to the thermal image to increase the resolution of the thermal image. The method of increasing the resolution of the thermal image is not limited to SRGAN, and thus estimator 35 may apply super-resolution convolutional neural network (SRCNN) to the thermal image to increase the resolution of the thermal image. Estimator 35 may also increase the resolution of the thermal image by determining the average value of the pixel values (temperatures) of adjacent pixels to insert, between the adjacent pixels, a new pixel whose pixel value corresponds to such average value.

Such super-resolution technology allows the generation of a high-resolution thermal image from inexpensive infrared sensor 21. Note that it is not essential to apply the super-resolution technology to a thermal image, and thus the process of increasing the resolution of the thermal image may be omitted.

Subsequently, estimator 35 estimates the coordinates of the target object in indoor space 50, on the basis of the thermal image (temperature distribution information) to which the super-resolution technology has been applied (S24).

Estimator 35 estimates the position of the target object in the thermal image, for example, by performing, on the thermal image, object detection processing that utilizes deep learning (machine learning model), and converts the position of the target object in the thermal image into coordinates in indoor space 50. More specifically, estimator 35 performs the object detection processing that is based on a method such as R-CNN, YOLO, and SSD. These machine learning models for performing the object detection processing are constructed, using, as training data, not typical color images, but thermal images obtained by imaging indoor space 50 (or another indoor space) from above.

Storage 33 stores table information that shows the correspondence between the position of each pixel in the thermal image and its coordinates in indoor space 50. Using such table information, estimator 35 is capable of converting the position of the target object in the thermal image into the coordinates of the target object in indoor space 50.

Note that when the thermal image shows the temperature distribution in a top view of indoor space 50, the coordinates of the position of the target object estimated by estimator 35 are two-dimensional coordinates in a top view of indoor space 50.

The following processes of step S25 through step S28 are the same as those of steps S14 through S17 in Embodiment 1.

As described above, position estimation system 10a estimates the coordinates of the target object with high accuracy, on the basis of the temperature distribution information. While it is sometimes difficult to identify a target object on the basis of the temperature distribution information, position estimation system 10a is capable of locating the position of such target object, using the position information obtained from positioning system 40 as the identification information of such target object. This allows position estimation system 10a to estimate with high accuracy what object is located in which position in indoor space 50 and manage what object is located in which position in indoor space 50.

In the foregoing example operation, estimator 35 estimates the coordinates of the target object in indoor space 50 by performing the object detection processing on the thermal image obtained by obtainer 34. However, estimator 35 may also perform processing of dividing a thermal image into regions. More specifically, estimator 35 may perform segmentation that utilizes deep learning (machine learning model). Estimator 35 is capable of estimating the coordinates of the target object in indoor space 50, on the basis of the position of the region in the thermal image showing such target object. The machine learning model for performing segmentation is constructed, for example, using, as training data, thermal images obtained by imaging indoor spaces 50 (or another indoor space) from above.

Estimator 35 may also estimate the coordinates of the target object by performing, on the thermal image, information processing that is based on a rule-based algorithm and using no machine learning model. For example, estimator 35 may perform processing of detecting a pixel whose pixel value is a local maximum value among a plurality of pixels included in the thermal image. Here, the pixel whose pixel value is a local maximum value refers to a pixel whose pixel value is a local maximum value in a two-dimensional arrangement of pixels. In other words, the pixel whose pixel value is a local maximum value refers to a pixel whose pixel value is greater than those of the surrounding pixels, when the pixel values that correspond to the same time in a two-dimensional arrangement of pixels are compared. A single thermal image can include a plurality of pixels whose pixel values are local maximum pixel values.

Assume here that no heat source is present in indoor space 50 whose temperature is higher than that of the target object. When a pixel whose pixel value is a local maximum value but is a small value (i.e., temperature is low), no target object can be considered to be present in the position that corresponds to such pixel. In view of this, estimator 35 can estimate that a target object is present in indoor space 50, when estimator 35 detects a pixel whose pixel value is a local maximum value and greater than or equal to a predetermined value (e.g., 30° C. or higher).

Also, estimator 35 is capable of estimating the coordinates of the position of the target object in indoor space 50 by applying the foregoing table information to the position of the pixel whose pixel value is a local maximum value and greater than or equal to the predetermined value (e.g., 30° C. or higher).

Another example of the information processing that is based on a rule-based algorithm is processing of detecting temporal changes in pixel values (temperatures) of a plurality of pixels included in the thermal image. Assuming that no heat source is present in indoor space 50 other than a target object, and when no target object is present in indoor space 50, temporal changes in pixel values (temperatures) of the plurality of pixels included in the thermal image are gradual. When a target object enters indoor space 50 in such state, the pixel values of the pixels of the portion in the thermal image showing the target object rapidly change (rise). By monitoring the temporal changes in the pixel values of the plurality of pixels, estimator 35 is able to estimate that a target object is present in indoor space 50, when a rapid rise occurs in the pixel values.

Estimator 35 is also able to estimate the coordinates of the position of the target object in indoor space 50 by applying the foregoing table information to the position of a pixel whose pixel values has risen rapidly.

[Variation of Positioning System]

Positioning system 40 measures the position of an object that holds first communication device 41, on the basis of the RSSI, observed at each of the plurality of second communication devices 42, of the beacon signal transmitted by first communication device 41. Here, position estimation system 10 or position estimation system 10a may include another positioning system instead of positioning system 40. Such other positioning system is, for example, a positioning system that measures the position of an object that holds a first communication device, on the basis of the RSSI, observed at the first communication device, of the beacon signal transmitted by each of a plurality of second communication devices. Stated differently, position estimation system 10 or position estimation system 10a may include a positioning system in which the relationship between transmission and reception of beacon signals is reversed with respect to positioning system 40.

Figure 9:
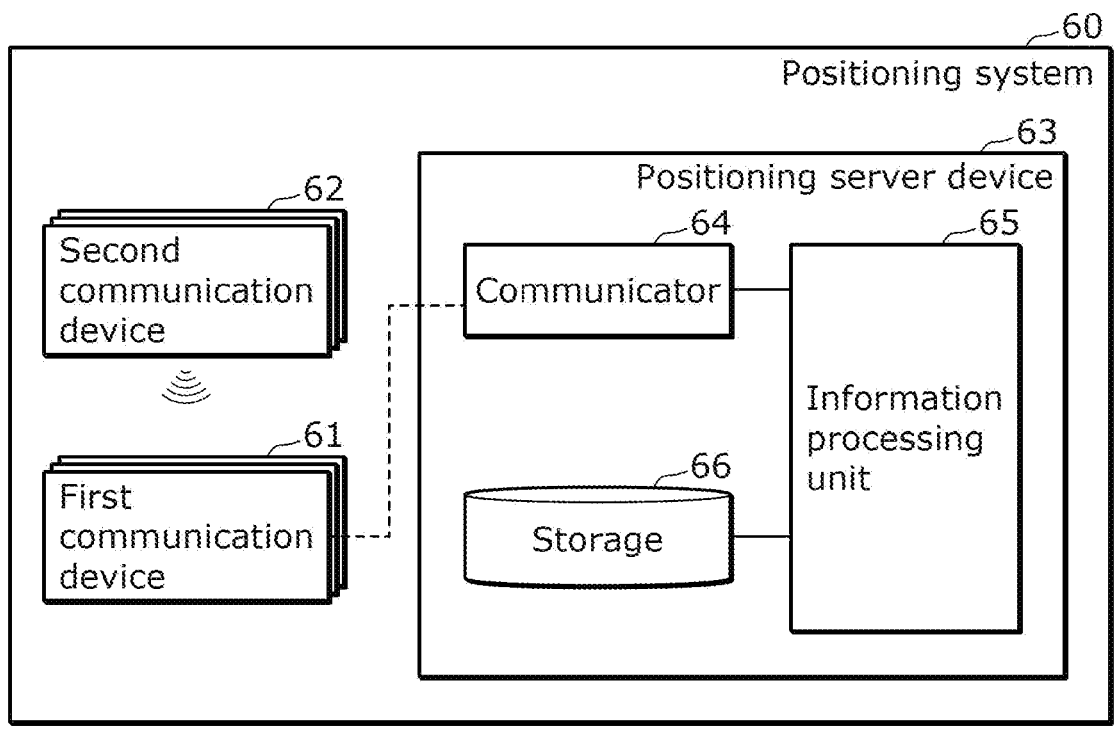
FIG. 9 is a block diagram showing the functional configuration of a positioning system according to a variation.
Figure 10:
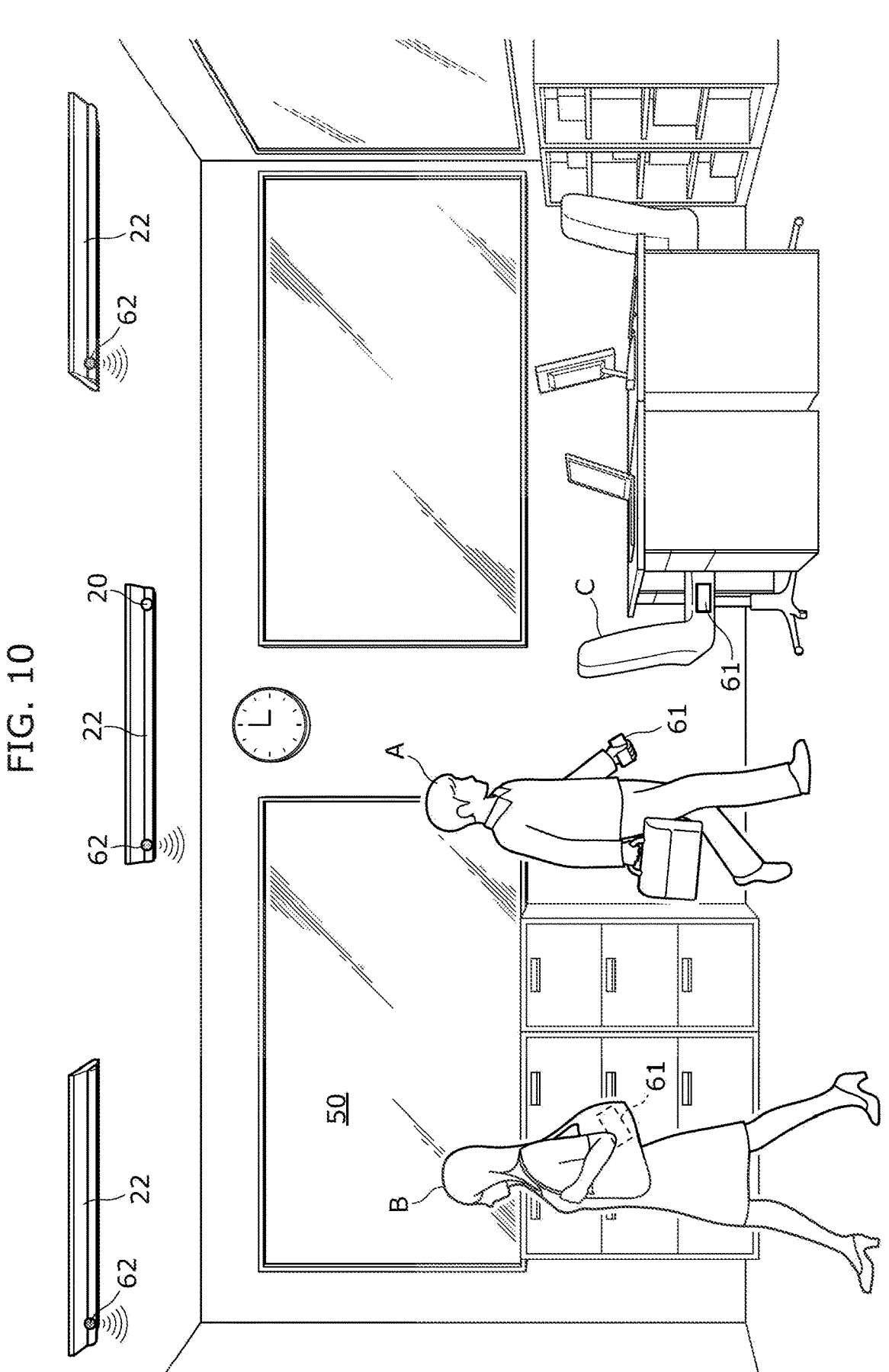
FIG. 10 is a diagram showing an indoor space to which the positioning system according to the variation is applied.

The following describes the positioning system according to such variation. FIG. 9 is a block diagram showing the functional configuration of the positioning system according to a variation. FIG. 10 is a diagram showing indoor space 50 to which the positioning system according to the variation is applied.

As shown in FIG. 9 and FIG. 10, positioning system 60 measures the position of an object located in indoor space 50, on the basis of a state of communication between first communication device 61 held by the object in indoor space 50 and a plurality of second communication devices 62 disposed in indoor space 50. Positioning system 60 includes a plurality of first communication devices 61, a plurality of second communication devices 62, and positioning server device 63. Note that positioning system 60 is simply required to include at least one first communication device 61.

First communication device 61 is a beacon receiver (scanner) that receives a beacon signal transmitted by each of the plurality of second communication devices 62. First communication device 61 measures the received signal strength indicator (RSSI) of the received beacon signal, and transmits, to positioning server device 63, signal strength information in which the measured RSSI is associated with the second identification information of second communication device 62 included in the beacon signal and the first identification information of the object that holds first communion device 61. Note that the first identification information can be the identification information of first communication device 61 per se.

First communication device 61 is, for example, a mobile information terminal (e.g., smartphone) capable of operating as a beacon receiver, but may also be a device that is specific to beacon reception. As shown in FIG. 10, first communication device 61 is held by an object (person or tangible object) located in indoor space 50.

Second communication device 62 is a beacon transmitter that transmits a beacon signal. The beacon signal includes second identification information of second communication device 62. As shown in FIG. 10, second communication device 62 is detachably connected, for example, to a power supply terminal included in lighting device 22 that is disposed on the ceiling of indoor space 50. Second communication device 62 operates on electric power supplied from lighting device 22. The power supply terminal is, for example, an USB terminal. Second communication device 62 may be fixed not via lighting device 22 but directly to the ceiling of indoor space 50. Second communication device 62 may also be fixed, for example, to a wall. Note that a plurality of second communication devices 62 are disposed in a two-dimensionally dispersed manner in a top view, as shown in FIG. 10.

Positioning server device 63 obtains, from first communication devices 61, items of signal strength information that correspond one to one to the plurality of second communication devices 62, and measures the position of the object that holds such first communication device 61 located in indoor space 50, on the basis of the items of signal strength information obtained. Positioning server device 63 is an edge computer provided in the facility (building) that includes indoor space 50, but may also be a cloud computer provided outside of such facility. Positioning server device 63 includes communicator 64, information processing unit 65, and storage 66.

Communicator 64 is a communication module (communication circuit) used by positioning server device 63 to communicate with the plurality of first communication devices 61 and server device 30. Communicator 64 receives, for example, the items of signal strength information that correspond one to one to the plurality of second communication devices 62 from each of the plurality of first communication devices 61. Communicator 64 also transmits position information of each object located in indoor space 50 to server device 30. Communication performed by communicator 64 may either be wireless communication or wired communication. A communications standard used for the communication is not limited to a specific communications standard.

Information processing unit 65 measures the position of the object located in indoor space 50, on the basis of the items of signal strength information received by communicator 64, and outputs position information indicating the measured position. Communicator 64 transmits the outputted position information to server device 30.

For example, information processing unit 65 measures the position of person A, on the basis of the items of signal strength information, transmitted by first communication device 61 held by person A, that correspond one to one to the plurality of second communication devices 62 and layout information indicating the layout (disposition position) of the plurality of second communication devices 62 in indoor space 50. Information processing unit 65 then outputs position information (i.e., position information of person A) in which the measured position is associated with the first identification information of person A. Any known algorithm may be used as a method of performing position measurement on the basis of the items of signal strength information and the layout information.

Information processing unit 65 is more specifically implemented in the form of a processor or a microcomputer. The function of information processing unit 65 is realized by means of the processor or the microcomputer that forms information processing unit 65 executing a computer program stored in storage 66.

Storage 66 is a storage device that stores the signal strength information received by communicator 64, the layout information indicating the layout of the plurality of second communication devices 62, and the computer program executed by information processing unit 65, and so forth. Storage 66 is more specifically implemented, for example, in the form of a semiconductor memory or an HDD.

As described above, positioning system 60 is capable of measuring the position of an object that holds first communication device 61, on the basis of the RSSI, observed at first communication device 61, of the beacon signal transmitted by each of the plurality of second communication devices 62. More specifically, positioning system 60 is capable of measuring what object is located in which position in indoor space 50. Position estimation system 10 or position estimation system 10a may include positioning system 60 instead of positioning system 40. In this case, position information obtainer 36 of server device 30 obtains the position information from positioning system 60.

As described above, position estimation system 10 or position estimation system 10a includes: obtainer 34 that obtains information which is one of image information of an image showing indoor space 50 in which a target object is located or temperature distribution information of indoor space 50; estimator 35 that estimates coordinates of the target object in indoor space 50, based on the information obtained; position information obtainer 36 that obtains target position information that is position information of the target object from a positioning system that measures a position of an object located in indoor space 50 based on a state of communication between a first communication device held by the object and a plurality of second communication devices disposed in indoor space 50; and controller 37 that stores, onto storage 33, identification information of the target object in association with the coordinates estimated, the identification information being included in the target position information obtained. Here, the positioning system is positioning system 40 or positioning system 60, the first communication device is first communication device 41 or first communication device 61, and the second communication device is second communication device 42 or second communication device 62.

Such position estimation system 10 or position estimation system 10a is capable of estimating with high accuracy what object is located in which position in indoor space 50.

Also, for example, position information obtainer 36: obtains, from the positioning system, items of position information indicating positions of objects located in indoor space 50; and obtains, as the target position information, one of the items of position information that indicates a position of a corresponding one of the objects that is located closest to the coordinates estimated.

Such position estimation system 10 or position estimation system 10a is capable of identifying the identification information of the target object, on the basis of the relationship of the distance between the estimated coordinates of the target object and the position indicated by the position information.

Also, in position estimation system 10, obtainer 34 obtains the image information of the image in a top view of indoor space 50, and estimator 35 estimates the coordinates, based on the image information obtained. The coordinates are two-dimensional coordinates in the top view of indoor space 50.

Such position estimation system 10 is capable of estimating with high accuracy what object is located in which position in indoor space 50, on the basis of the image information.

Also, in position estimation system 10a, obtainer 34 obtains the temperature distribution information indicating a temperature distribution of indoor space 50 in a top view of indoor space 50, and estimator 35 estimates the coordinates, based on the temperature distribution information obtained. The coordinates are two-dimensional coordinates in the top view of indoor space 50.

Such position estimation system 10a is capable of estimating with high accuracy what object is located in which position in indoor space 50, on the basis of the temperature distribution information.

Also, for example, positioning system 40 measures the position of the object, based on a received signal strength indicator of a beacon signal transmitted by first communication device 41, the received signal strength indicator being observed at each of the plurality of second communication devices 42.

Such position estimation system 10 or position estimation system 10a is capable of estimating with high accuracy what object is located in which position in indoor space 50, on the basis of the position information provided by positioning system 40.

Also, for example, positioning system 60 measures the position of the object, based on a received signal strength indicator of a beacon signal transmitted by each of the plurality of second communication devices 62, the received signal strength indicator being observed at first communication device 61.

Such position estimation system 10 or position estimation system 10a is capable of estimating with high accuracy what object is located in which position in indoor space 50, on the basis of the position information provided by positioning system 60.

Also, for example, the target object is a person.

Such position estimation system 10 or position estimation system 10a is capable of estimating with high accuracy what object is located in which position in indoor space 50.

Also, for example, the target object is an object other than a person.

Such position estimation system 10 or position estimation system 10a is capable of estimating with high accuracy what tangible object is located in which position in indoor space 50.

Also, the position estimation method executed by a computer such as position estimation system 10 or position estimation system 10a includes: obtaining information which is one of image information of an image showing indoor space 50 in which a target object is located or temperature distribution information of indoor space 50; estimating coordinates of the target object in indoor space 50, based on the information obtained; obtaining target position information that is position information of the target object from a positioning system that measures a position of an object located in indoor space 50 based on a state of communication between a first communication device held by the object and a plurality of second communication devices disposed in indoor space 50; and storing identification information of the target object in association with the coordinates estimated, the identification information being included in the target position information obtained.

Such position estimation method is capable of estimating with high accuracy what object is located in which position in indoor space 50.

Other Embodiment

The position estimation system and the position estimation method according to the embodiments have been described above, but the present invention is not limited to the foregoing embodiments.

In the foregoing embodiments, the position estimation system is realized by means of a plurality of devices, but may also be realized by means of a single device. For example, the position estimation system may be realized by means of a single device that corresponds to a server device. When the position estimation system is realized by means of a plurality of devices, the elements included in the position estimation system may be allocated to the plurality of devices in any manner. For example, the server device may include some or all of the functions of the positioning server device.

Also, in the foregoing embodiments, processing performed by a specified processing unit may be performed by another processing unit. Also, the processing order of a plurality of processes may be changed, and a plurality of processes may be performed in parallel.

Each of the elements in the foregoing embodiments may be realized by executing a software program suitable for the element. Each of the elements may be realized by means of a program executing unit, such as a CPU and a processor, reading and executing the software program recorded on a recording medium such as a hard disk or a semiconductor memory.

Also, each of the elements may also be configured in the form of a hardware product. For example, the elements may be configured in the form of circuits (or integrated circuits). These circuits may form a single circuit as a whole, or may be individual circuits. Each of these circuits may be a general-purpose circuit or an exclusive circuit.

Also, general or specific aspects of the present invention may be implemented in the form of a system, a device, a method, an integrated circuit, a computer program, or a computer-readable recording medium such as a CD-ROM. These general and specific aspects may also be implemented using any combination of systems, devices, methods, integrated circuits, computer programs, or recording media. The present invention may be realized, for example, in the form of a position estimation method executed by a computer such as the position estimation system. The present invention may also be realized in the form of a program for causing a computer to execute the position estimation method, or as a non-transitory, computer-readable recording medium having recorded thereon such program.

The scope of the present invention also includes an embodiment achieved by making various modifications to each of the embodiments that can be conceived by those skilled in the art or an embodiment achieved by freely combining elements and functions in the embodiments without departing from the essence of the present invention.

REFERENCE SIGNS LIST 10, 10a position estimation system
20 camera
21 infrared sensor
22 lighting device
30 server device
31, 44, 64 communicator
32, 45, 65 information processing unit
33, 46, 66 storage
34 obtainer 35 estimator
36 position information obtainer
37 controller
40, 60 positioning system
41, 61 first communication device
42, 62 second communication device
43, 63 positioning server device
50 indoor space (space)

The invention claimed is:

1. A position estimation system comprising:
an infrared array sensor configured to capture thermal images;
a communication circuit that receives, by communicating with the infrared array sensor, a thermal image of a space in which a target object is located, the thermal image being generated by the infrared array sensor;
an estimator that estimates, by monitoring a temporal change in a pixel value of each of a plurality of pixels included in the thermal image received, coordinates of the target object in the space, based on a degree of the temporal change in the pixel value monitored;
a position information obtainer that obtains target position information that is position information of the target object from a positioning system that measures a position of an object located in the space based on a state of communication between a first communication device held by the object and a plurality of second communication devices disposed in the space; and
a controller that stores, onto storage, identification information of the target object in association with the coordinates estimated, the identification information being included in the target position information obtained.

2. The position estimation system according to claim 1, wherein the position information obtainer:
obtains, from the positioning system, items of position information indicating positions of objects located in the space; and
regards, as the target object, an object located closest to the coordinates estimated and selects, as the target position information, one of the items of position information that indicates the object.

3. The position estimation system according to claim 1, wherein the communication circuit receives the thermal image indicating a temperature distribution of the space in a top view of the space,
the estimator estimates the coordinates, based on the thermal image received, and
the coordinates are two-dimensional coordinates in the top view of the space.

4. The position estimation system according to claim 1, wherein the positioning system measures the position of the object, based on a received signal strength indicator of a beacon signal transmitted by the first communication device, the received signal strength indicator being observed at each of the plurality of second communication devices.

5. The position estimation system according to claim 1, wherein the positioning system measures the position of the object, based on a received signal strength indicator of a beacon signal transmitted by each of the plurality of second communication devices, the received signal strength indicator being observed at the first communication device.

6. The position estimation system according to claim 1, wherein the target object is a person.

7. The position estimation system according to claim 1, wherein the target object is an object other than a person.

8. A position estimation method for implementation by a position estimation system, the position estimation system including:

at least one processor;

a memory connected to the at least one processor and configured to store a program executable by the at least one processor; and an infrared array sensor configured to capture thermal images, wherein the at least one processor is configured to execute the program stored in the memory to perform the position estimation method, the position estimation method comprising:

receiving, by communicating with the infrared array sensor, a thermal image of a space in which a target object is located, the thermal image being generated by the infrared array sensor;

estimating, by monitoring a temporal change in a pixel value of each of a plurality of pixels included in the thermal image received, coordinates of the target object in the space, based on a degree of the temporal change in the pixel value monitored;

obtaining target position information that is position information of the target object from a positioning system that measures a position of an object located in the space based on a state of communication between a first communication device held by the object and a plurality of second communication devices disposed in the space; and storing identification information of the target object in association with the coordinates estimated, the identification information being included in the target position information obtained.

9. The position estimation system according to claim 1, wherein the infrared array sensor is connected to a lighting device disposed on a ceiling of the space and receives electricity supply from the lighting device, and one of the plurality of second communication devices receives electricity supply from the lighting device.

10. The position estimation method according to claim 8, wherein the infrared array sensor is connected to a lighting device disposed on a ceiling of the space and receives electricity supply from the lighting device, and one of the plurality of second communication devices receives electricity supply from the lighting device.

\* \* \* \* \*